Nov. 11, 1924.

H. H. ORDUNG

JAR

Filed April 30, 1923

1,514,988

INVENTOR
H. H. Ordung
BY
ATTORNEYS

Patented Nov. 11, 1924.

1,514,988

UNITED STATES PATENT OFFICE.

HENRY H. ORDUNG, OF LAPORTE, INDIANA.

JAR.

Application filed April 30, 1923. Serial No. 635,732.

*To all whom it may concern:*

Be it known that I, HENRY H. ORDUNG, a citizen of the United States, and a resident of Laporte, in the county of Laporte and State of Indiana, have invented a new and useful Improvement in Jars, of which the following is a full, clear, and exact description.

My invention relates to improvements in jars, and it consists in the combinations, constructions, and arrangements herein described and claimed.

The principal object of my invention is to provide an improvement over that form of the device shown in my co-pending application, Serial No. 552,144, allowed Nov. 24, 1922. In said prior application I disclosed a jar which has clamping members removably secured thereto. These clamping members were moved slightly over the top of the can when they were swung into closed position. I have found that these members become worn through use, and therefore will not clamp the cover on tightly. In the present form of the device I provide a locking member which is adapted to contact with the cover at only one place, and to remain in this place during the entire swinging of the member into locked position.

A further object of my invention is to provide a device of the type described, which is prevented from being moved off from the top of the cover after it is once swung into locked position.

A further object of my invention is to provide a device of the type described which is simple in construction, and which is adapted to lie snug against the top of the cover when swung into closed position.

A further object of my invention is to provide a device of the type described which has novel means to permit the cover to be readily removed from the can by an implement such as a can opener or knife, even though the cover is held in place by the vacuum within the can.

Other objects and advantages will appear in the following specification, and the novel features of the invention will be particularly pointed out in the appended claim.

Figure 1:
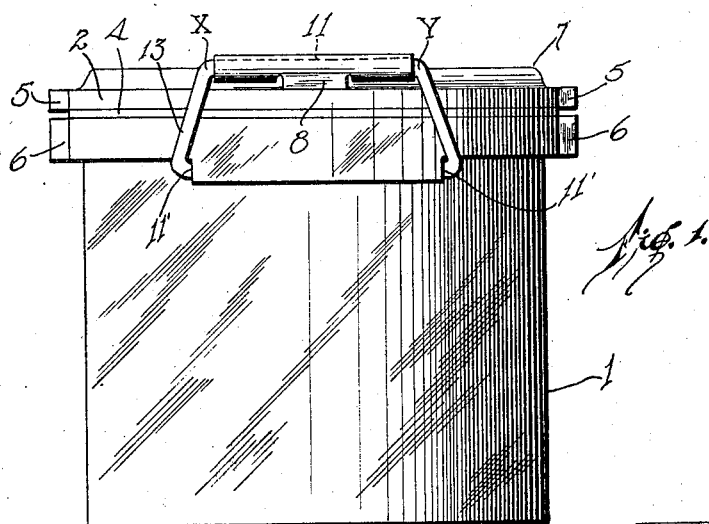
Figure 2:
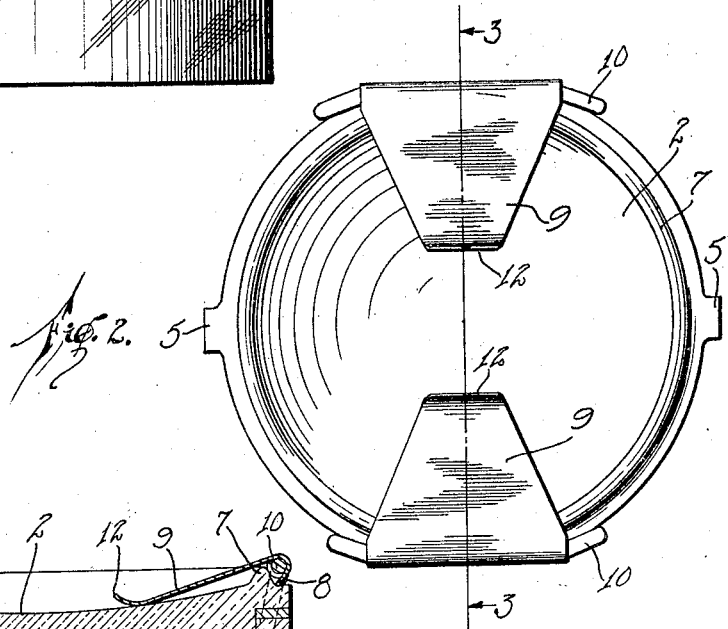
Figure 3:
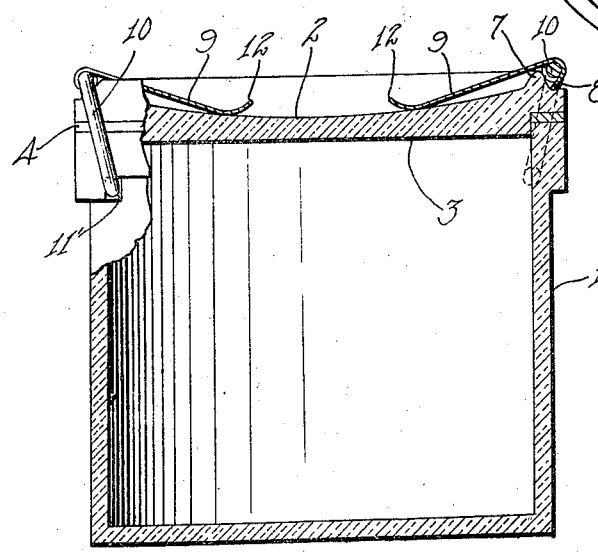

My invention is illustrated in the accompanying drawings forming part of the application, in which Figure 1 is a side elevation of a fruit can showing the device operatively applied thereto, Figure 2 is a plan view of Figure 1, and Figure 3 is a section along the line 3—3 of Figure 2.

In carrying out my invention I make use of a can which consists of a receptacle 1 and a cover 2. The cover 2 has a cylindrical portion 3 that is adapted to extend a slight distance into the top of the receptacle 1. The portion 3 abuts the inner wall of the receptacle 1 and prevents lateral movement of the cover with respect to the receptacle. A gasket 4 is disposed between the cover and the receptacle and makes a liquid-tight connection when the cover is disposed in place. In the present form of the device I have shown the device as being made of glass, but it is obvious that the device can be made out of any other material desired.

In many cases, the cover 2 is disposed upon the receptacle before the contents in the receptacle have become cool, whereupon a partial vacuum is created in the receptacle as soon as the contents have cooled. In the ordinary type of jar cover and receptacle, the knife or can opener has to be pried between the cover and the receptacle in order to loosen the cover to permit air to enter the receptacle to relieve the vacuum. In order to pry the cover loose, the rubber gasket has to be torn. In the present form of the device, I have shown the cover being provided with lugs 5 and the receptacle 1 as being provided with lugs 6, these lugs being spaced from each other by the gasket 4. It will be observed from this construction that a blade can be inserted between the lugs 5 and 6 and turned so as to readily pry the cover 2 loose from the receptacle 1.

The form of the device disclosed in my co-pending application showed a bead on the cover which was disposed adjacent to the peripheral edge of the cover. This bead was for the purpose of engaging with the portion of the locking member which contacted with the top of the cover so as to prevent the member from being moved away from the cover. This bead of course would be made of glass if the entire jar were made of glass. The bead is likely to be cracked by the locking member engaging therewith, thereby marring the jar. The broken glass would likely drop into the receptacle 1 if the operator were not especially careful. To overcome this disadvantage I provide a cover 2 with a bead 7 that is spaced from the periphery of the cover. This bead acts as a stop for the cover engaging portion 8 of the locking member 9. In the present form of the device I have provided two of the locking members 9, these members being pivotally carried by the walls 1. They in turn have their free ends rotatably disposed in openings 11′ of the receptacle 1. The portion of the wire extending from the opening 11′ to the locking member 9 is of a predetermined length so as to cause the portion 8 to clamp the cover 2 in place when the member is swung into closed position. The straight portion 11 of the wire 10 acts as a pivot for the member 9. When the member 9 is in closed position, the free end of the portion 8 is disposed off center with respect to the wire 11, and tends to swing about the wire 11 so as to cause the handle portion 12 of the member 9 to move toward the cover 2.

It will be noted that the wire 10 extends outwardly from the member 9, (see Figure 1). In other words, the space between the ends of the wire at the pivot points 11′ is greater than the space between the points $x$ and $y$, of the wire. Furthermore, the pivot points 11′ are disposed nearer the center of the longitudinal axis of the can than are the points $x$ and $y$. This can be readily seen from looking at Figure 3. The peripheries of the cover 2 and the receptacle 1 are the same, and therefore points disposed closer together on the periphery will be further removed from the longitudinal axis of the receptacle than are points disposed a greater distance from each other. The portion 13 of the wire will therefore extend inwardly from the portion 11 to the pivot points 11′, (see Figure 3). The wire 10 will therefore have a tendency to move the clamping member inwardly over the cover 2 instead of outwardly. In the co-pending application I have shown portions 13 of the wire as extending parallel with the longitudinal axis of the receptacle. The clamping member can be readily moved from the cover if the portions of the wire extending between the pivot points of the receptacle to the pivot points of the clamping member are parallel to the longitudinal axis of the receptacle. The bead disposed adjacent to the periphery of the cover in the co-pending application prevented the clamping member from being moved outwardly with respect to the cover. As heretofore stated, in this form of the device, the clamping members tend to move inwardly due to the action of the wire on the member. The bead 7 can therefore be spaced from the periphery of the cover, and act as a positioning flange for the portion 8 of the members 9, instead of the retaining flange which was the case in the co-pending application.

From the foregoing description of the various parts of the device, the operation thereof may be readily understood. The jar is filled in the same manner as an ordinary jar. The gasket 4 and the cover 2 are then disposed and are clamped in place by means of the members 9. Before the clamping members 9 are swung into place, the cover 2 is adjusted so as to align the lugs 5 with the lugs 6. In securing the clamping members 9 to the cover 2, it is merely necessary to move the members up over the cover 2, this movement being permitted by the wire 10, which has its ends pivotally disposed in the openings 11′. The portions 8 of the members 9 are disposed in the groove formed by the flange 7, and the portion of the cover that projects beyond the flange. The members 9 may now be swung about the portions 11 of the wire 10 into the full line position shown in Figure 3. This movement will merely cause the wire 10 to rock still further about its ends that are disposed in the openings 11′. The swinging of the member 9 into clamped position after the portion 8 has been disposed adjacent to the flange or bead 7 will not cause the portion 8 to move with respect to the cover. It will therefore be obvious that the end of the portion 8 that engages with the top of the cover will not be worn through use, since it is not frictionally moved across the top of the cover each time the clamping member is swung into clamped position. This is a distinct advantage over the co-pending application.

As heretofore stated, the portions 13 of the wire 10 extend inwardly from the portions 11 when the clamping members are in closed position. The wire 10 therefore tends to move the members 9 toward the center of the can. The members 9 therefore cannot be moved off from the top of the cover after they have once been swung into closed position.

When it is desired to remove the cover from the receptacle or jar, the members 9 are swung about the portions 11 of the wire 10 so as to remove the members from the cover. In case the cover is held on by the vacuum within the jar, it is merely necessary to insert the knife blade or other like implement between the lugs 5 and 6, and twist the blade so as to force the cover from the jar.

The principal advantages of this device over the co-pending application are the disposing of the bead 7 on the inner side of the portions 8, whereby the bead does not act as a retaining means for the clamping member 9, but merely acts a positioning member; the bending of the arms of the wire so that they extend outwardly from each other from the members 9 whereby the ends of the wire are pivotally secured at points that are closer to the longitudinal axis of the jar than are the points x and y, thus providing a novel construction which prevents the members 9 from moving off from the top of the cover; and the positioning of the portion 8 of the member 9 in such a place that the portion will not be moved over the top of the cover when the member 9 is swung into clamped position.

I claim:

The combination with a jar having a cover, a flange disposed on the top of said cover and being spaced from the edge thereof, of clamps carried by said jar, wires pivotally connected to said clamps and to said jar, each clamp being adapted to contact with said cover in two places when swung into clamping position, said clamps having a cover engaging portion adapted to contact with said cover adjacent to the exterior side of said flange, and to remain in this position during the entire movement of said clamps, into clamping engagement, said wires being connected to the clamps, and to the jar in such a manner that the portions of the wires extending between the clamps and the jar project inwardly toward the center of the jar from the pivotal connection of the clamps with the wires.

HENRY H. ORDUNG.